Oct. 4, 1955  L. V. McCARTY ET AL  2,719,673
CONVERSION UNITS FOR FUEL CONTROL VALVES
Filed July 18, 1953  4 Sheets-Sheet 1

INVENTORS
LOURDES V. McCARTY
BY FERDINAND F. HEISER

John W. Michael
ATTORNEY

Oct. 4, 1955  L. V. McCARTY ET AL  2,719,673
CONVERSION UNITS FOR FUEL CONTROL VALVES
Filed July 18, 1953  4 Sheets-Sheet 2

INVENTORS
LOURDES V. McCARTY
FERDINAND F. HEISER
BY
John W. Michael
ATTORNEY

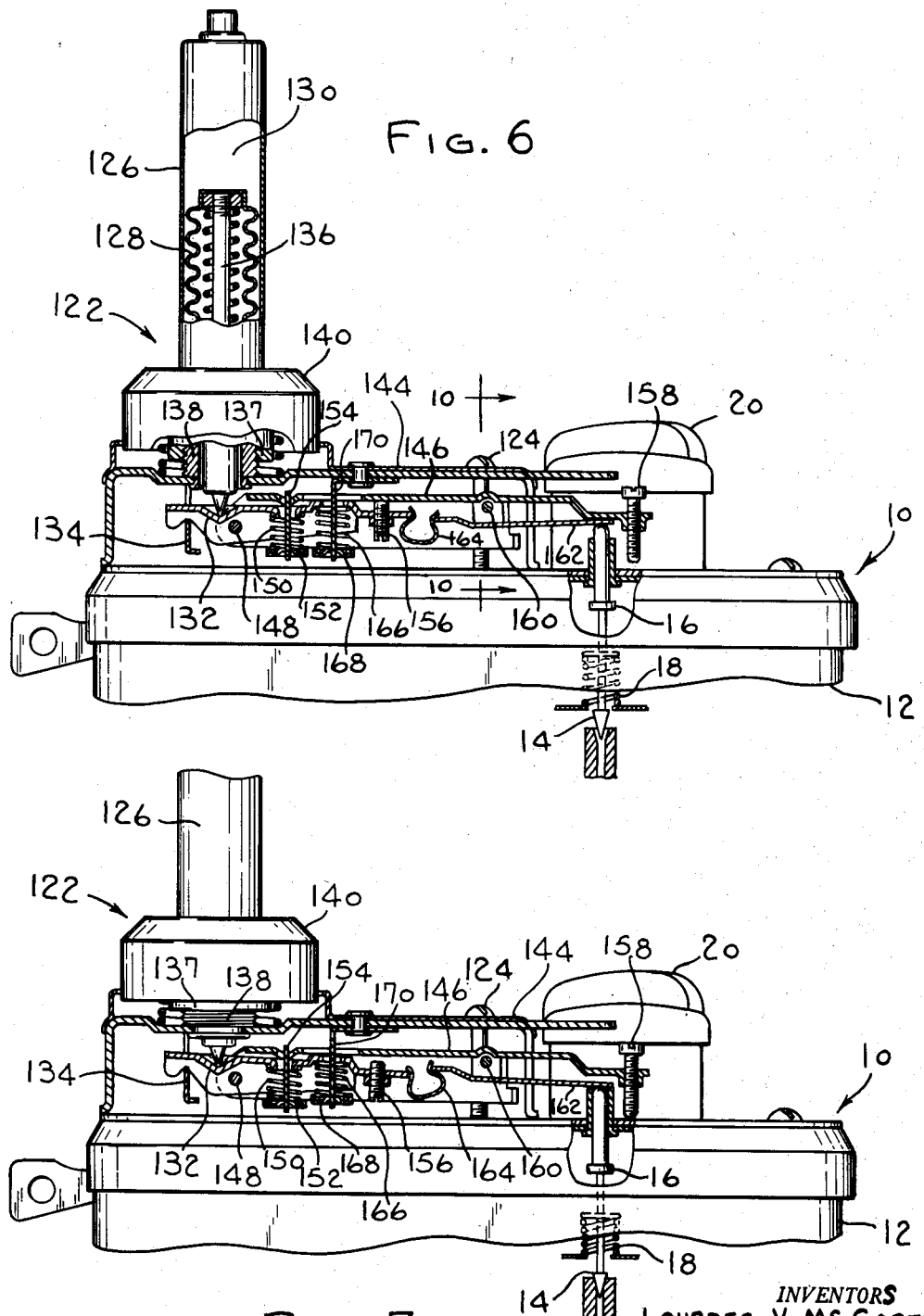

Oct. 4, 1955     L. V. McCARTY ET AL     2,719,673
CONVERSION UNITS FOR FUEL CONTROL VALVES
Filed July 18, 1953     4 Sheets-Sheet 4

*INVENTORS*
LOURDES V. McCARTY
BY FERDINAND F. HEISER
*John W. Michael*
ATTORNEY United States Patent Office 2,719,673
Patented Oct. 4, 1955

2,719,673

CONVERSION UNITS FOR FUEL CONTROL VALVES

Lourdes V. McCarty and Ferdinand F. Heiser, Milwaukee, Wis., assignors to A P Controls Corporation, Milwaukee, Wis., a corporation of Wisconsin Application July 18, 1952, Serial No. 299,586

12 Claims. (Cl. 236—48)

This invention relates to a conversion unit for fuel control valves and more particularly to an automatic control which will regulate movement of an oil control valve in accordance with ambient temperature changes.

This conversion unit or top is adapted for mounting on an oil control valve which is normally adapted for manual control. After conversion the manual oil control valve becomes a thermostatically regulated oil control valve. In such a converted unit, or in any oil control for that matter, the principal problem is to pass through the so-called sooty stage of operation of the burner. The sooty range of operation lies between the pilot flow and the higher fire flow rates. Therefore, the present control is adapted to move the metering valve rapidly between these rates of oil flow and thus avoid sooty operation. As a result the pot burns clean at all times and will not accumulate soot which would adversely affect the combustion characteristics of the burner.

The principal object of this invention, therefore, is to provide a conversion top for manual oil control valves which avoids the sooty stage of operation while providing thermostatically regulated heat.

Another object of this invention is to provide an automatic control for oil control valves which will respond to ambient temperature changes at the control. Such a control is principally adapted for use on space heaters where the heating apparatus is located in the heated medium.

Other objects and advantages will be pointed out in, or be apparent from, the specification and claims, as will obvious modifications of the two embodiments shown in the drawings, in which:

Figs. 6–10 are similar to Figs. 1–5 but show another modification.

Figure 1:
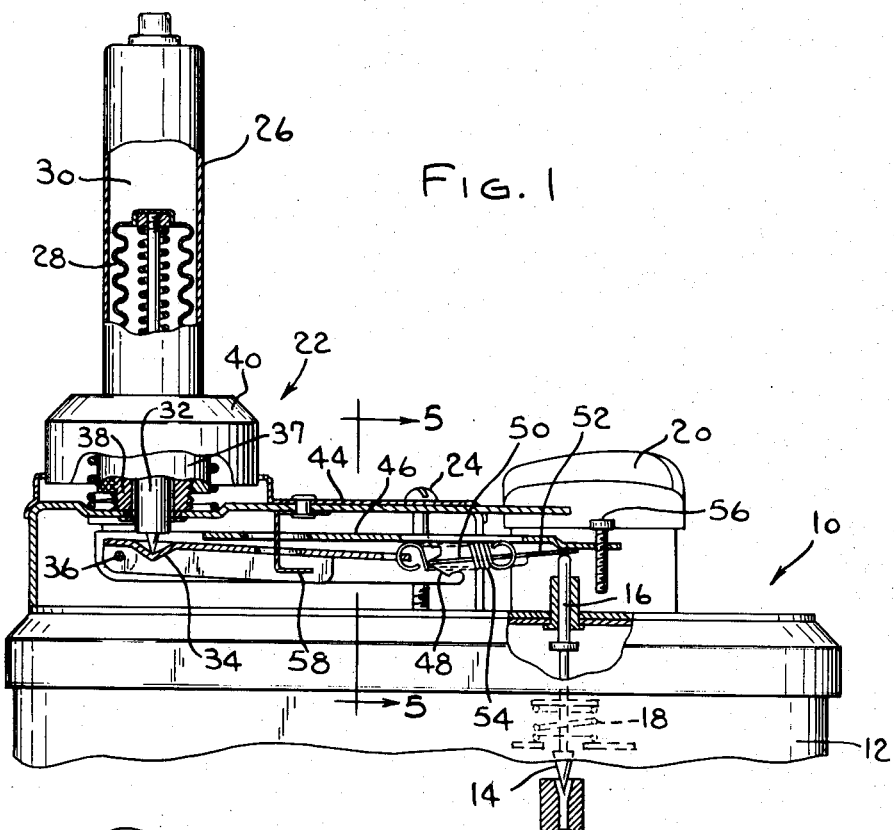
Fig. 1 is a side elevation, partly in section and partly diagrammatic, to show the preferred conversion top mounted on the oil control valve.

The preferred conversion top (shown in Figs. 1–5) is adapted to be mounted on manually operated oil control valve 10 of the type employed to meter liquid fuel flow to a pot-type burner. The oil control valve illustrated in the drawings is of the type wherein the mechanism contained within the casing 12 includes a float-controlled inlet valve, not shown, and an outlet valve 14 (shown diagrammatically). In the drawing, valve 14 is shown as being directly operated upon by pin 16 which projects through the top of casing 12. The valve is biased towards its open position by the means of a spring 18. In practice, valve 14 is not directly connected to pin 16 but is connected to the pin indirectly through a lever mechanism which may be regulated by knob 20 which actuates the leverage to regulate the maximum opening of the outlet valve. The details of such structure form no part of this invention but may be seen in Patent No. 2,317,063. It will be understood that other types of oil control valves incorporating different mechanism may be employed so long as provision is made for operating the outlet valve from a position outside the casing. For the purpose of this invention it need be understood only that pin 16 may be used to operate valve 14. Since spring 18 biases the valve towards its open position the valve may be closed by depressing pin 16 and will open when pin 16 is released.

Conversion top 22 is adapted to be mounted on the top of oil control valve casing 12 by means of a pair of screws 24 and includes an upwardly projecting cylindrical bulb 26 which, in cooperation with bellows 28, defines a chamber 30. The chamber is charged with a temperature responsive fluid which will flex bellows 28 in accordance with ambient temperature variations. Movement of the bellows 28 is transmitted by means of pin 32 to actuating lever 34 pivotally mounted on pin 36. Thus, as the temperature of the charge in chamber 30 increases, bellows 28 will drive pin 36 downwardly and turn lever 34 in a clockwise direction about its fulcrum 36.

The bulb and bellows assembly is provided with a female threaded section 37 which threads on a male threaded section 38 and permits the space between the bellows and the actuating lever to be adjusted and thus vary the response temperature of the bulb. As may be seen in Fig. 3, the frusto-conical face 40 of the base portion of the bulb and bellows assembly is provided with suitable indicia for indicating the variation in response temperature occasioned by rotation of the assembly. A suitable pointer 42 is provided on the top surface 44 of the casing to cooperate with such indicia in indicating the response temperature setting.

Actuating lever 34 is one of three levers which form a compound leverage adapted to operate upon pin 16 in regulating valve 14 to provide oil flow to the burner at the desired rate to maintain the preset ambient temperature condition about the feeler bulb 26. Actuating lever 34 is mounted within the confines of the inverted channel-like control lever 46 which is also pivotally mounted on pin 36. As may be seen in Figs. 1, 2 and 4 the depending sides or legs of control lever 46 are each provided with a notch 48 facing in the direction of the free end of the control lever. The laterally projecting arm-like portions 50 of operating lever 52 are engaged in notches 48 in the control lever and the operating lever is held in this position by means of tension spring 54 connected to the operating lever 52 and to actuating lever 34. When the feeler bulb calls for heat and positions the compound leverage to pass oil flow at a rate greater than pilot flow the actuating lever 34 and the operating lever 52 will occupy the positions shown in Fig. 1 with respect to control lever 46. In this position tension spring 54 holds the operating lever 52 against the underside of the free end of control lever 46. If the ambient temperature conditions call for still greater flow the three levers will move in a counter-clockwise direction in unison while maintaining the relationship shown in Fig. 1 with respect to each other. Since spring 18 biases pin 16 and valve 14 in a valve opening direction the valve will of course open as the levers rise from the top of the oil control casing 12.

The free end of control lever 46 is provided with an adjustable stop screw 56 which limits the downward or clockwise movement of the control lever when the pin 56 strikes the top of the casing 12. When the pin contacts the top of the casing the leverage will occupy a position corresponding to the upper limit of the sooty range of burner operation. If the feeler bulb calls for a still further reduction in the rate of oil flow the bellows will move pin 32 downwardly to drive actuating lever 34 about its pivot point. Since control lever 46 is unable to move, the actuating lever moves with respect to the control lever. After lever 34 moves in a clockwise direction for a predetermined distance the tension spring 54 is moved to a position in which the force exerted by the spring tends to move the operating lever in a clockwise rather than a counter-clockwise direction. When this occurs the operating lever snaps over center in a toggle fashion to deliver a sharp blow to pin 16 and move valve 14 to its pilot position (or to close valve 14 in the event that the oil control is provided with a separate pilot flow orifice). The relative positions when the parts are in the pilot position are shown in Fig. 2.

Figure 2:
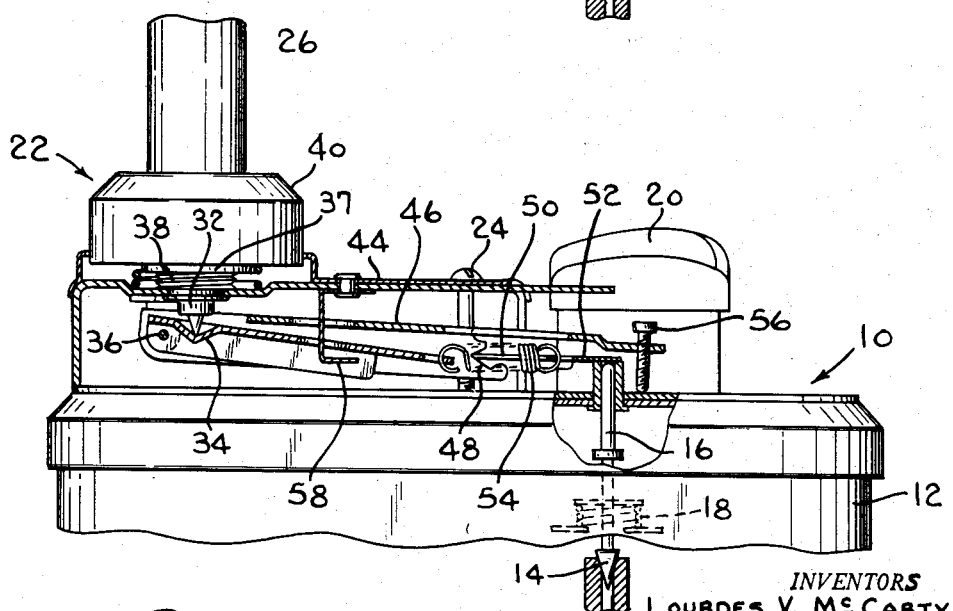
Fig. 2 is similar to Fig. 1 but shows the control in its pilot position.
Figure 3:
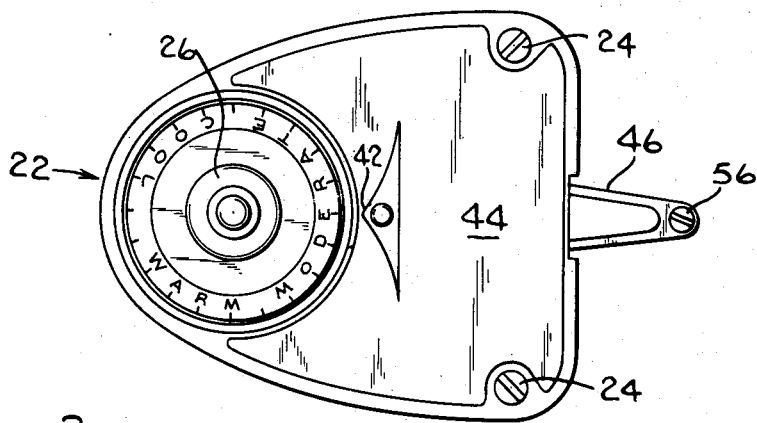
Fig. 3 is a top view of the conversion top.
Figure 4:
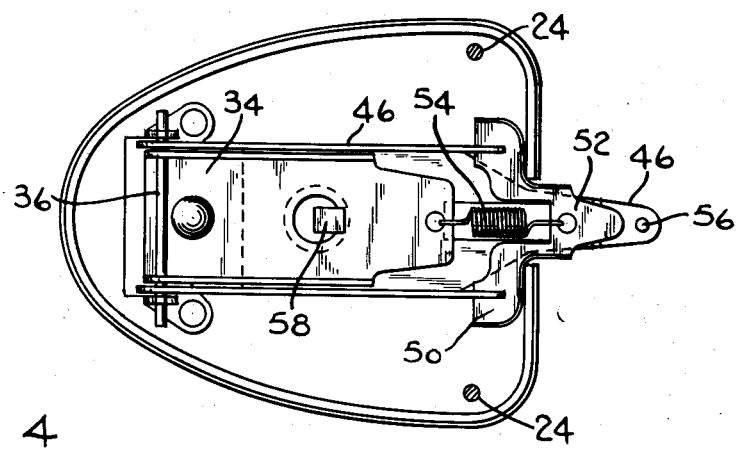
Fig. 4 is a bottom view of the conversion top.
Figure 5:
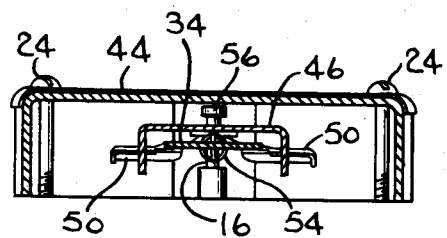
Fig. 5 is a section taken as indicated by line 5—5 on Fig. 1.
Figure 8:
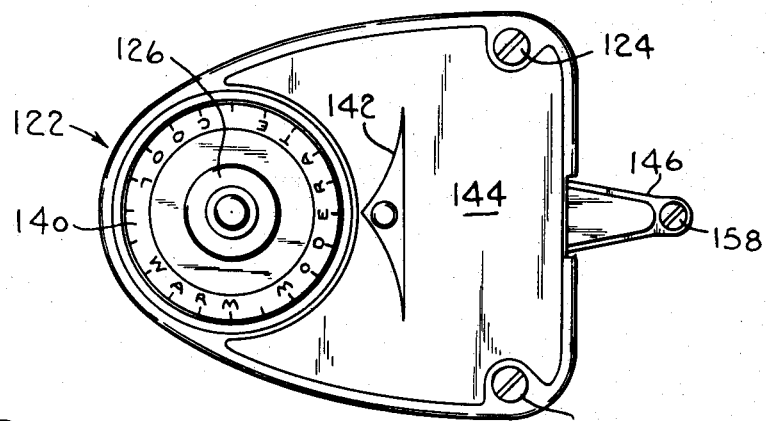
Figure 9:
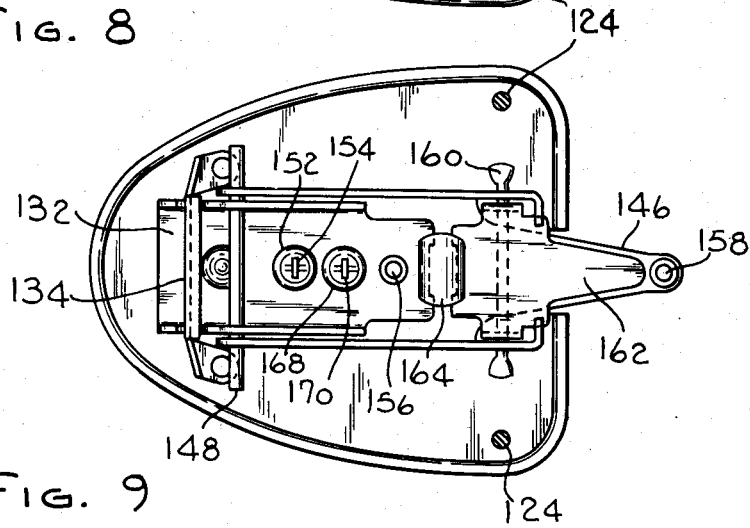
Figure 10:
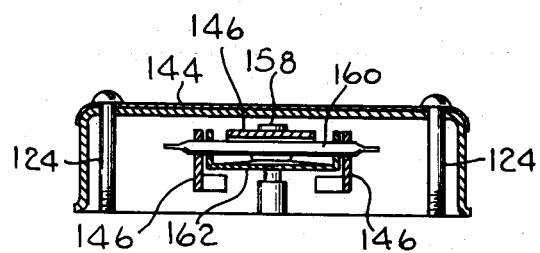

When the compound lever is in the position shown in Fig. 2, the actuating lever 34 has passed far enough over the center position of the toggle mechanism to cause spring 54 to exert sufficient force to hold the valve closed in opposition to valve spring 18. It will be appreciated that the greater the force exerted by bellows 28 on lever 34 through the medium of pin 32 tending to force the lever 34 further in a counter-clockwise direction the greater will be the force of spring 54 tending to hold valve 14 closed. Bearing in mind that the spring 54 always tends to aline lever 34 and operating lever 52, it will be apreciated that as the charge in bulb 26 calls for an increased oil flow and allows lever 34 to move in a counter-clockwise or valve opening direction, the force exerted by spring 54 will decrease as levers 34, 52 approach alinement. When the levers are fairly close to alinement the force of valve spring 18 is sufficient to move operating lever 52 in a counter-clockwise direction about its fulcrum point to throw the toggle-acting spring 54 over center while moving operating lever 52 back into contact with the underside of control lever 46. At this point the oil flow will be at the rate slightly above the upper limit of the sooty flow rate. At this time toggle spring 54 also acts to hold all the levers in the position shown in Fig. 1 and therefore actuating lever 34 and control lever 46 will move in unison and will act to regulate movement of the oil control outlet valve 14 in the range above the sooty flow range.

The principal purpose of the depending stop 58 which passes through cooperating apertures and levers 34, 46 is to prevent the entire leverage mechanism from swinging out of the conversion top casing during handling prior to installation on the oil control.

In the second modification (shown in Figs. 6 through 10) the conversion top 122 is mounted on the valve casing 12 by means of screws 124. Flexure of bellows 128 in accordance with the temperature of the charge in chamber 130 defined by the bellows and bulb 126 is transmitted to actuating lever 132 by pin 136. Lever 132 is pivotally mounted on fulcrum 134 and is driven in a clockwise or valve closing direction as the temperature of the charge in chamber 130 increases.

Lever 132 is one of three levers which form a compound leverage adapted to regulate pin 16 in regulating movement of valve 14. Spring 166, compressed between the actuating lever and cup 168 carried by pin 170 depending from the underside of the casing, acts on the lever to urge the lever upwardly against the bellows pin 136. The compound levers normally occupy the relationship shown in Fig. 6. The downwardly struck sides of control lever 146 are pivotally mounted on pin 148 which in turn is supported on the downwardly struck sides of the actuating lever 132. Spring 150 is compressed between the actuating lever and a cup 152 supported by pin 154 depending from the control lever 146. This spring 150 urges the actuating and control levers towards each other. An adjusting screw 156 limits the motion of the levers towards each other. The outer end of control lever 146 overlies pin 16 and is provided with an adjustable stop screw 158 which limits the downward movement of the right-hand end of lever 146. Since the actuating lever is movable with respect to the control lever 146 it will be appreciated that further downward movement of bellows 128 will be operative to continue moving the actuating lever 132 while the control lever 146 fulcrums about the point of contact between stop screw 158 and the top of the valve casing. Such movement of the control lever is possible by virtue of the pivotal interconnection between the actuating and control levers.

A pivot pin 160 carried by a control lever 146 supports operating lever 162 for pivotal movement with respect to the control lever 146. The operating lever is connected to the actuating lever 132 through the medium of generally U-shaped toggle-acting spring 164. Spring 164 is compressed in this modification as opposed to the tension spring in the preferred modification. When the compound leverage is in the position shown in Fig. 6 the actuating lever is biased upwardly by spring 150 to its stop. When in this condition or position, the forces between the actuating lever and the operating lever are such that the left end of the operating lever 162 is biased in a counter clockwise direction and the free end of the operating lever 162 overlies the pin 16 and contacts the underside of second lever 146. Therefore, the operating lever and lever 146 will move in unison so long as the control lever is not in position where the stop 158 contacts the top of the valve casing. Upon contact of stop 158 with the top of the valve casing further downward movement of the control lever is prevented. However, continued movement of bellows 128 in the valve closing direction forces actuating lever 132 downwardly against the bias of springs 150 and 166 to separate the actuating lever from the control lever. When this movement has continued beyond a position determined by the adjustment of screw 156, the forces occasioned by the toggle spring 164 are reversed and the toggle lever then moves in a clockwise direction with a snap action. Stop 158 is adjusted to correspond to the upper limit of the sooty rate of oil flow. As the charge in chamber 130 cools, bellows 128 will move upwardly and allow spring 150 to move the lever 132 towards the control lever 146 until the operating lever snaps over center to establish the rate of flow above the sooty range. Upon further upward movement of the bellows 128 the compound leverage will follow under the influence of spring 166 and valve spring 18.

The tension spring toggle action shown in the preferred embodiment of Figs. 1 through 5 is preferred to the compressed spring modification shown in Figs. 6 through 10 since the response temperature can be held within closer limits than possible with the compressed spring.

The present conversion top is capable of regulating the oil flow in accordance with thermostatic demand for heat without operating the pot burner in the sooty range. Thus as the fire is raised from pilot to a higher fire position the oil valve is snapped through the sooty range of oil flow positions. Similarly as the control decreases the fire it is impossible to operate the pot at a sooty rate of oil flow. It will be noted that the response temperature of the thermostatic control may be adjusted. It should also be noted that the present control provides for modulation of the oil flow rate (except, of course, through the sooty range) as compared to the usual thermostatic demand systems which provide principally for ON-OFF operation of the burner.

It will be appreciated that either conversion top can be manufactured at low cost since many parts are stampings which may be readily assembled and easily adjusted to secure the desired operating characteristics. With the above description in mind it will be apparent that other forms of construction may be employed without departing from the spirit of this invention. The leverage mechanisms shown herein may be varied by substitution of known equivalents while retaining the snap action characteristic through the sooty stage of oil flow. Therefore this invention is not to be limited by the scope of the above description but is to be limited only by the scope of the claims. As used in the claims "bellows" and "movable wall" are used as equivalents and are intended to include bellows, diaphragms, and similar devices.

It will be appreciated that similar structures and principles are applicable to gas control valves for driving the valve through critical flow stages rapidly. The claims are intended to cover such uses and applications within the limits of the claims.

We claim:

1. An automatic control for a fuel valve, comprising a housing, a fulcrum in the housing, an actuating lever mounted on the fulcrum, a spring acting on said lever to urge the lever in a valve opening direction, a control lever pivotally mounted on the actuating lever, a second spring urging said levers towards each other to retain the levers in contact during normal operation, an operating lever pivotally mounted on said control lever, a toggle-acting spring interconnecting the actuating and operating levers, said toggle-acting spring being operative to hold said operating lever against said control lever in normal operation, means including a bellows defining a chamber, said chamber being charged with a temperature responsive fluid operative to flex the bellows, means operatively connecting the bellows to said actuating lever to transmit the movement of the bellows to the actuating lever, said bellows operating on said first spring in opposition to the bias of said first spring, means for limiting valve closing movement of said control lever under influence of the bellows, said second spring being operative to yield upon said control lever reaching its limit of movement to permit the actuating lever to continue movement in the valve closing direction, continued movement of the actuating lever being operative to throw said toggle spring over center to move the operating lever from the control lever in the valve closing direction, the operating lever being adapted to actuate a fuel metering valve.

2. A conversion top for oil control valves of the type having an actuating pin projecting through the top of the valve casing and operably connected to the outlet valve regulating flow from the casing, comprising, a housing adapted for mounting on the control valve, a fulcrum in said housing, a compound leverage mounted on said fulcrum, means including a bellows defining a chamber, a temperature responsive charge in said chamber operative to flex the bellows with changes in temperature, means operatively connecting the bellows to the leverage to act on the leverage in the valve closing direction as the temperature of said chamber increases, said leverage including first and second levers, means retarding movement of the second lever in a valve closing direction beyond a predetermined position, said leverage including a toggle spring acting on the first lever and causing the first lever to travel in unison with the second lever through its range of movement and moving the first lever rapidly between said predetermined position and a position corresponding to a pilot fire, said first lever being adapted for operative connection to the oil control valve and being adapted to rapidly move the oil control valve through the sooty stage of burner operation.

3. A conversion top according to claim 2 in which the last named means comprises a toggle-acting mechanism connecting the first lever to a third lever which is mounted on said fulcrum, said bellows being operatively connected to said third lever, said third lever being movable with respect to said first and second levers at positions of said first and second levers between the pilot fire and said predetermined position and being movable in unison with said first and second levers at positions above said predetermined position.

4. A conversion top according to claim 3 in which the second and third levers are pivotally interconnected and including spring means for biasing the second and third levers towards each other.

5. A conversion top for oil control valves of the type having a valve operable by means of a pin projecting through the valve casing, comprising, a housing, a fulcrum in the housing, an actuating lever on said fulcrum, means including a bellows defining a chamber, a temperature responsive charge in the chamber for flexing the bellows in accordance with ambient temperature variation, means operatively connecting the bellows to the lever to transmit movement of the bellows to the lever, a control lever pivotally connected to the actuating lever, means biasing the actuating lever and the control lever towards each other, said actuating lever and said control lever being adapted for movement in unison under influence of the bellows, means located at a point remote from the pivotal interconnection between said levers for limiting movement of the control lever in a given direction past a given position, said actuating lever being adapted for continued movement under influence of the bellows in said given direction after the limiting means are in operation, such continued movement of the actuating lever being in opposition to the said biasing means, an operating lever pivotally mounted on said control lever, a toggle spring interconnecting the actuating lever and the operating lever, said operating lever being operable to contact the control lever when the actuating lever contacts the control lever and being thrown out of contact with the control lever by the toggle spring when the actuating lever moves away from the control lever, said operating lever being adapted to operate on said pin.

6. Control mechanism adapted for use in conjunction with fuel control valves of the type having a pin projecting through the valve casing and operably connected to the valve so that the pin may be manipulated to control the opening and closing of the valve, comprising, a housing, means including a bellows defining a chamber mounted on the housing, a temperature responsive charge in said chamber, a fulcrum in the housing, an actuating lever mounted on the fulcrum, a control lever pivotally connected to the actuating lever, spring means biasing the actuating and control levers towards each other, second spring means biasing both of said levers in the valve opening direction, means operably connecting the bellows to the actuating lever to move the levers in opposition to the bias of said second spring, means for limiting the valve closing movement of the control lever beyond a given point, an operating lever pivotally mounted on said control lever and being adapted to act on said pin to regulate opening and closing movement of the valve, a toggle spring interconnecting the actuating and operating levers, said toggle spring being adapted to bias the operating lever in the valve opening direction and into contact with the control lever when the actuating lever is in contact with the control lever and being operative to move the operating lever in the valve opening direction when the actuating lever moves away from the control lever a predetermined distance against the bias of the first named spring, said bellows being operative to continue moving the actuating lever after further valve closing movement of the control lever is prevented by said limiting means to thereby move the toggle spring over center to drive the operating lever in the valve closing direction.

7. A conversion top for oil control valves of the type having an actuating pin projecting through the top of the valve casing and operably connected to the outlet valve regulating flow from the casing, comprising, a housing adapted for mounting on the control valve, a fulcrum in said housing, an actuating lever and a control lever mounted on said fulcrum, an operating lever pivotally mounted with respect to the actuating lever and adapted to actuate said valve pin, a spring tensioned between the actuating lever and the operating lever, said spring acting to urge the actuating lever towards the control lever and the operating lever into contact with the control lever in one position of the spring and acting to urge the operating lever away from the control lever in another position of the spring, said spring being operable to move the operating lever out of contact with the control lever when the actuating lever is moved with respect to the control lever, means for limiting movement of the control lever in a given direction, means including a movable wall for defining a chamber and mounted on said housing, means operatively connecting the movable wall to the actuating lever to impart movement of the movable wall to the lever, a temperature responsive charge in the chamber operative to move the movable wall, said movable wall being operable to move the actuating lever farther in a given direction when further movement of the control lever in the same direction is prevented to thereby cause the tensioned spring to snap the operating lever out of contact with the control lever and impart accelerated movement of the operating lever in said direction.

8. A conversion top for oil control valves of the type having a valve-actuating pin projecting through the top of the valve casing and operably connected to the outlet valve regulating flow from the casing, comprising, a housing adapted to be mounted on the control valve, a fulcrum in the housing, means including a movable wall for defining a chamber and mounted on said housing, a temperature responsive charge in said chamber operable to move said wall, an actuating lever and a control lever mounted on said fulcrum, means operably connecting said wall to said actuating lever, an operating lever pivotally connected to said control lever and having an end adapted to overlie the valve-actuating pin, a toggle-acting spring interconnecting said actuating lever and said operating lever, said spring being normally operative to bias the actuating lever and the operating lever toward the control lever to maintain the levers in a predetermined relationship for conjoint movement under the influence of said movable wall, means limiting movement of the control lever in the valve closing direction, continued movement of said wall in a direction corresponding to the valve closing movement of the levers being operable to move the actuating lever away from the control lever until said spring is operative to snap the operating lever over center and out of contact with the control lever whereby the operating lever moves in the valve closing direction with a snap action, the snap action of movement of the operating lever being predetermined to correspond to the sooty range of operation of the oil control valve.

9. A conversion top for oil control valves of the type having an actuating pin projecting through the top of the valve casing and operatively connected to the outlet valve regulating flow from the casing to a burner, comprising, a housing adapted to be mounted on the control valve, a fulcrum in the housing, means including a movable wall for defining a chamber and mounted on the housing, an actuating lever and a control lever pivotally mounted on said fulcrum, means operatively connecting said wall to said actuating lever, an operating lever pivotally mounted on said control lever, a temperature responsive charge in said chamber operative to move said wall in accordance with temperature variations, an increase in temperature in said chamber being operable to move said wall in the valve closing direction, adjustable stop means on said control lever limiting movement of the control lever in the valve closing direction, spring means interconnecting the actuating lever and the operating lever and normally operable to bias the actuating lever and the operating lever toward the control lever for conjoint movement, movement of said wall in a valve closing direction beyond the position corresponding to said predetermined position of said control lever being operable to move the actuating lever away from the control lever and reverse the force exerted by said spring to throw the operating lever away from the control lever in the valve closing direction with a snap action, the range of movement of the snap action of the operating lever being preset to correspond to the sooty stage of operation of said oil control valve.

10. A conversion top for oil control valves of the type having an actuating pin projecting through the top of the valve casing and operatively connected to the outlet valve regulating oil flow from the casing to a burner, comprising, a housing adapted to be mounted on the control valve, an actuating lever pivotally mounted in said housing, a control lever pivotally mounted in said housing, an operating lever pivotally mounted on said control lever, toggle-acting spring means interconnecting the operating and actuating levers, means mounted on the housing and including a movable wall for defining a chamber, a temperature responsive charge in the chamber for moving said wall in response to temperature variations, means operably connecting said wall to said actuating lever, means retarding movement of said control lever in the valve closing direction beyond a position corresponding to the upper limit of the sooty range of operation of the oil control valve, said toggle spring being operable to bias the operating lever into contact with the control lever at all positions above said position and being operable to move the operating lever away from the control lever with a snap action in a valve closing direction after the actuating lever has moved a predetermined distance in the valve closing direction beyond the position of the actuating lever corresponding to the position of the control lever at which further valve closing movement of the control lever is retarded, the snap acting range of the operating lever corresponding to the sooty range of operation of the oil control valve.

11. Fuel valve controlling apparatus comprising, a housing, temperature responsive motor means in said housing, a pivotally mounted lever in said housing and having one end adapted for operative connection to a valve to regulate movement of the valve throughout the range of movement of the lever, means operatively connecting said motor means to said lever to transfer movement from the motor means to the lever, means retarding movement of said lever in the valve closing direction beyond a predetermined point, said connecting means permitting continued movement of the motor means in the valve closing direction after movement of said lever in the closing direction has been retarded by said limiting means, a second lever pivoted on the first lever and operatively interposed between the first lever and the valve, toggle spring means between said connecting means and second lever normally biasing said second lever into contact with the first lever for movement therewith but operative to snap the second lever away from the first lever in the valve closing direction when the motor means continues movement in the closing direction a predetermined distance after closing movement of the first lever is retarded by said limiting means.

12. Apparatus according to claim 11 in which said connecting means includes a third lever pivotally mounted in the housing and acted upon by said motor means, said toggle spring being connected between the first and third levers.

References Cited in the file of this patent

UNITED STATES PATENTS

| | | | |
|---|---|---|---|
| 1,928,497 | McKinley | Sept. 26, | 1933 |
| 2,087,072 | Smith | July 13, | 1937 |
| 2,249,623 | Taylor | July 15, | 1941 |
| 2,305,429 | Johnson | Dec. 15, | 1942 |